US008584160B1

(12) United States Patent
Huang et al.

(10) Patent No.: US 8,584,160 B1
(45) Date of Patent: Nov. 12, 2013

(54) SYSTEM FOR APPLYING METADATA FOR OBJECT RECOGNITION AND EVENT REPRESENTATION

(75) Inventors: Ting-Han Huang, Taichung (TW); Kang-Wen Lin, New Taipei (TW); Juin-Yi Huang, Taipei (TW); Chia-Yi Wu, Taipei (TW); Yu-Chen Huang, Taipei (TW); Ching-Fan Chu, Taipei (TW); Po-Chih Tsai, Tainan (TW); Tung-Jen Tsai, New Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 13/593,894

(22) Filed: Aug. 24, 2012

(30) Foreign Application Priority Data

Apr. 23, 2012 (TW) .............................. 101114427 A

(51) Int. Cl.
H04N 7/10 (2006.01)
H04N 7/173 (2011.01)
G06K 9/46 (2006.01)
G06K 9/72 (2006.01)

(52) U.S. Cl.
USPC .............. 725/32; 725/114; 382/190; 382/229

(58) Field of Classification Search
USPC .............................. 725/32, 114; 382/190, 229
See application file for complete search history.

(56) References Cited

U.S. PATENT DOCUMENTS

| | | | | |
|---|---|---|---|---|
| 5,264,933 A | * | 11/1993 | Rosser et al. ................. | 348/578 |
| 5,543,856 A | * | 8/1996 | Rosser et al. ................. | 348/578 |
| 5,566,251 A | * | 10/1996 | Hanna et al. .................. | 382/284 |
| 5,892,554 A | * | 4/1999 | DiCicco et al. ............... | 348/584 |
| 5,923,791 A | * | 7/1999 | Hanna et al. .................. | 382/295 |
| 5,929,849 A | * | 7/1999 | Kikinis ......................... | 725/113 |
| 5,953,076 A | * | 9/1999 | Astle et al. .................... | 348/584 |
| 6,100,925 A | * | 8/2000 | Rosser et al. ................. | 348/169 |
| 6,357,042 B2 | * | 3/2002 | Srinivasan et al. ............ | 725/32 |
| 7,444,656 B2 | * | 10/2008 | Lemmons ....................... | 725/32 |
| 7,796,155 B1 | * | 9/2010 | Neely et al. ................... | 348/157 |
| 8,285,052 B1 | * | 10/2012 | Bhattacharyya et al. ...... | 382/190 |
| 2001/0023436 A1 | * | 9/2001 | Srinivasan et al. ............ | 709/219 |
| 2004/0031062 A1 | * | 2/2004 | Lemmons ...................... | 725/136 |
| 2005/0137958 A1 | * | 6/2005 | Huber et al. ................... | 705/37 |
| 2009/0027500 A1 | * | 1/2009 | Elangovan et al. ............ | 348/159 |
| 2011/0040757 A1 | * | 2/2011 | Kossi et al. ................... | 707/737 |
| 2011/0164163 A1 | * | 7/2011 | Bilbrey et al. .......... | 348/333.01 |
| 2011/0216179 A1 | * | 9/2011 | Dialameh et al. .............. | 348/62 |
| 2011/0295742 A1 | * | 12/2011 | Boncyk et al. ................. | 705/39 |
| 2012/0062595 A1 | * | 3/2012 | Oh et al. ........................ | 345/633 |
| 2012/0115513 A1 | * | 5/2012 | Han ............................ | 455/456.3 |
| 2012/0148106 A1 | * | 6/2012 | Sung et al. .................... | 382/106 |
| 2012/0180084 A1 | * | 7/2012 | Huang et al. .................. | 725/32 |
| 2012/0230540 A1 | * | 9/2012 | Calman et al. ................ | 382/103 |
| 2012/0232966 A1 | * | 9/2012 | Calman et al. ................ | 705/14.1 |
| 2012/0233033 A1 | * | 9/2012 | Calman et al. ................ | 705/27.1 |
| 2012/0272158 A1 | * | 10/2012 | Weskamp et al. ............. | 715/748 |
| 2013/0031582 A1 | * | 1/2013 | Tinsman et al. ............... | 725/36 |
| 2013/0040660 A1 | * | 2/2013 | Fisher et al. ............... | 455/456.1 |
| 2013/0055325 A1 | * | 2/2013 | Wilson .......................... | 725/105 |
| 2013/0124551 A1 | * | 5/2013 | Foo ............................. | 707/758 |

* cited by examiner

*Primary Examiner* — James R Sheleheda
(74) *Attorney, Agent, or Firm* — Rabin & Berdo, P.C.

(57) ABSTRACT

An object recognition and event representation system includes: a server and a broadcaster, coupled to the server. In response to a request from the broadcaster, the server sends an event metadata and a recognition data. Based on the event metadata and the recognition data, the broadcaster simultaneously performs a live video broadcasting and a real-time object recognition. If the broadcaster recognizes an object, the broadcaster sends a recognition result to the server.

14 Claims, 12 Drawing Sheets

United States Patent US 8,584,160 B1

SYSTEM FOR APPLYING METADATA FOR OBJECT RECOGNITION AND EVENT REPRESENTATION

This application claims the benefit of Taiwan application Serial No. 101114427, filed Apr. 23, 2012, the subject matter of which is incorporated herein by reference.

BACKGROUND

1. Technical Field

The disclosure relates in general to a system for applying metadata for object recognition and event representation.

2. Description of the Related Art

The application of computer technology and multi-media has become a focus to modern people in their everydayness. In terms of entertainment and sports, the fans may release their pressures by way of watching live games in the ball field and cheering their favorite teams/players.

However, when watching live games, viewers may not understand there are accidental events happening in the stadium because the viewing field of the viewers may be restricted due to the arrangement of the seat.

For those who cannot watch live games in the stadium, they may choose to watch TV broadcasting of the game. However, it is even more difficult for the audience of TV broadcasting to understand the current atmosphere or other events happening in the stadium if the camera of the broadcasting unit is not directed towards these events.

The disclosure discloses a system for applying metadata for object recognition and event representation, which, through the relevant information collected by the on-site audience, provides real-time statistical information to other users for them to be more fit in the atmosphere no matter they are at the stadium or not.

SUMMARY OF THE DISCLOSURE

The disclosure is directed to a system for applying metadata for object recognition and event representation. The system enables other users to obtain real-time statistical information with the relevant information collected by the on-site audience.

According to an exemplary embodiment of the present disclosure, an object recognition and event representation system including a server, and a broadcaster coupled to the server is disclosed. In response to a request sent from the broadcaster, the server sends an event metadata and a recognition data. According to the event metadata and the recognition data, the broadcaster simultaneously performs a live video broadcasting action and a real-time object recognition action. If the broadcaster recognizes an object, the broadcaster sends a recognition result to the server.

The above and other contents of the disclosure will become better understood with regard to the following detailed description of the preferred but non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION OF THE DISCLOSURE

Figure 1:
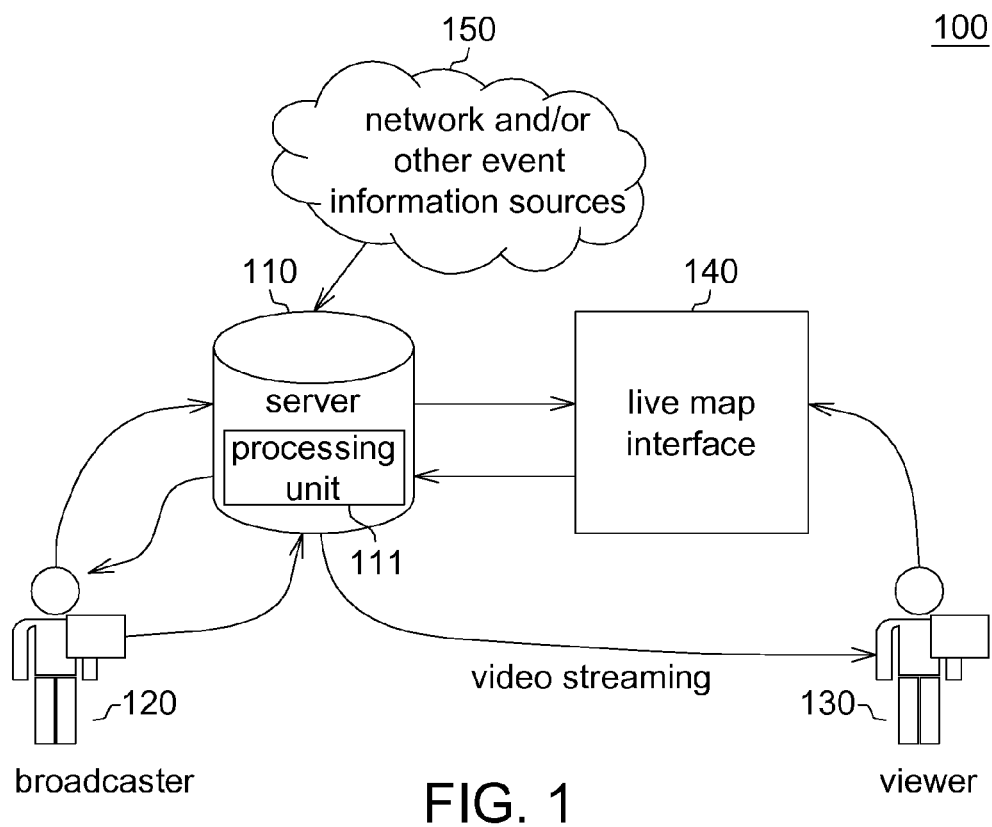
FIG. 1 shows a system for applying metadata for object recognition and event representation according to an embodiment of the disclosure.

Referring to FIG. 1, a system for applying metadata for object recognition and event representation according to an embodiment of the disclosure is shown. As indicated in FIG. 1, the object recognition and event representation system 100 includes a server 110, at least one broadcaster 120 and at least one viewer 130. The broadcaster 120 is not necessary a broadcasting unit. The server 110 includes a processing unit 111 coupled to an event database (illustrated in another diagram) and a recognition database (illustrated in another diagram). The broadcaster 120 and the viewer 130 are such as electronic devices of users who are watching the live game. In the disclosure below, the broadcaster 120 and the viewer 130 may refer to the users.

The operations of the present embodiment of the disclosure are as follows. Let the live broadcasting of a game be taken for example. The broadcaster 120 may download an "event metadata" from an event database of the server 110. In the present embodiment, object recognition is used as an example. After the "event metadata" is downloaded, the broadcaster 120 recognizes players or people in the stadium based on the event metadata, and sends a recognition result to the server 110. The recognition result sent from the broadcaster 120 may be used as a part of the event database of the server 11. Here, "metadata" refers to data for describing data, and details of the metadata are disclosed below.

Before recognition, the user needs to have a photo, an image, or a voice sample of the to-be-recognized object in advance. In convention, those users who want to perform recognition need to prepare the photo, image, and voice sample by themselves in advance; and in recognition, the captured image is compared with the prepared photo to determine whether recognition is successful. Therefore, the conventional technologies require the users to prepare a large volume of data (such as photo, image, and voice) associated with the to-be-recognized object by themselves, which is indeed troublesome and inconvenient to the users. In the embodiment of the disclosure, data associated with the to-be-recognized object is prepared by the server, not by the user. After the user sends a request to the server, the server sends data and metadata associated with the to-be-recognized object to the user to facilitate object recognition.

If the viewer 130 is interested in the live audio or video frames captured by the broadcaster 120, the viewer 130, after securing the consent from the broadcaster 120, may view the live audio or video frames captured by the broadcaster 120 through the live map interface 140 in a real-time manner. Here, the live map interface 140 may be realized in the form of a webpage or an application (APP).

Furthermore, if the live map interface 140 is realized in the form of a webpage, the viewer 130 may be connected to the server 110 via such as a browser to view the live audio/video frames captured by the broadcaster 120 in a real-time manner. If the live map interface 140 is realized in the form of an application, the application may proactively send the live audio/video frames captured by the broadcaster 120 to the device (such as mobile phone, notebook computer, computer, and tablet PC) of the viewer 130 in a real-time manner.

For the metadata requested by the broadcaster 120, the server 110 may further be connected to a network and/or other event information sources 150 to obtain more relevant metadata.

In addition, the broadcaster 120 may install an application to activate the event metadata and image recognition function. For example, the application may be installed in the storage unit 215.

Figure 2:
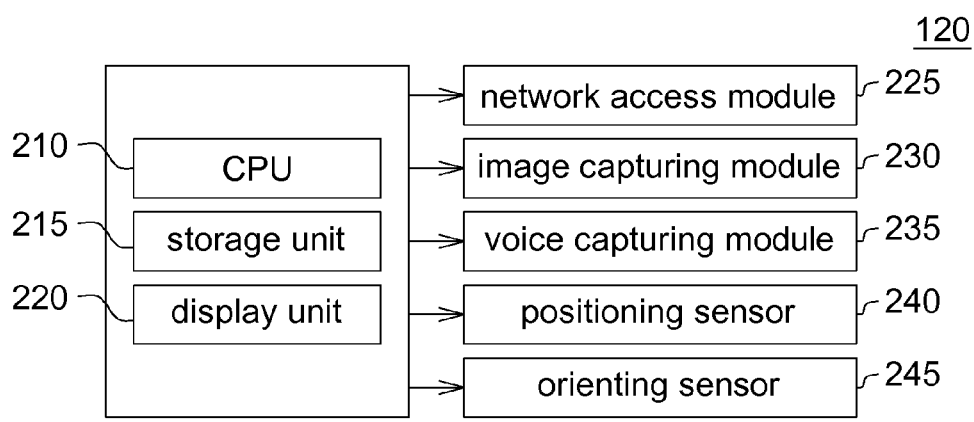
FIG. 2 shows a functional block diagram of a hardware architecture of a broadcaster 120 according to an embodiment of the disclosure.

FIG. 2 shows a functional block diagram of a hardware architecture of the broadcaster 120 according to the embodiment of the disclosure. As indicated in FIG. 2, the broadcaster 120 includes a processing unit 210 (such as a central processing unit (CPU)), a storage unit 215, a display unit 220, a network access module 225, an image capturing module 230, a voice capturing module 235, a positioning sensor 240 and an orienting sensor 245. The operating system of the broadcaster 120 is not limited thereto.

The processing unit 210 is used for performing operation such as facial recognition. The storage unit 215 is used for storing data, such as the event metadata sent from the server 110. The display unit 220 is used for displaying images such as images captured by the broadcaster 210. The broadcaster 120 may be connected to the server 110 via the network access module 225 by way of wire connection or wireless connection. The image capturing module 230 and the voice capturing module 235 are used for capturing images and voices, such as image and voice of a to-be-recognized object, for recognition. The positioning sensor 240, such as a global positioning system (GPS), is used for positioning the longitude and latitude of the broadcaster 210. The orienting sensor 245 (such as a digital compass) may identify the current direction of the broadcaster 210 (such as the direction pointed by the device of the broadcaster 210). The broadcaster 210 may send its position information and direction information to the server 110.

Similarly, the functional block diagram of the viewer 130 may be similar or identical to that of the broadcaster 120. The viewer 130 may selectively include an image capturing unit, a voice capturing unit, a positioning sensor and an orienting sensor. The operating system of the viewer 130 is not limited thereto.

Figure 3:
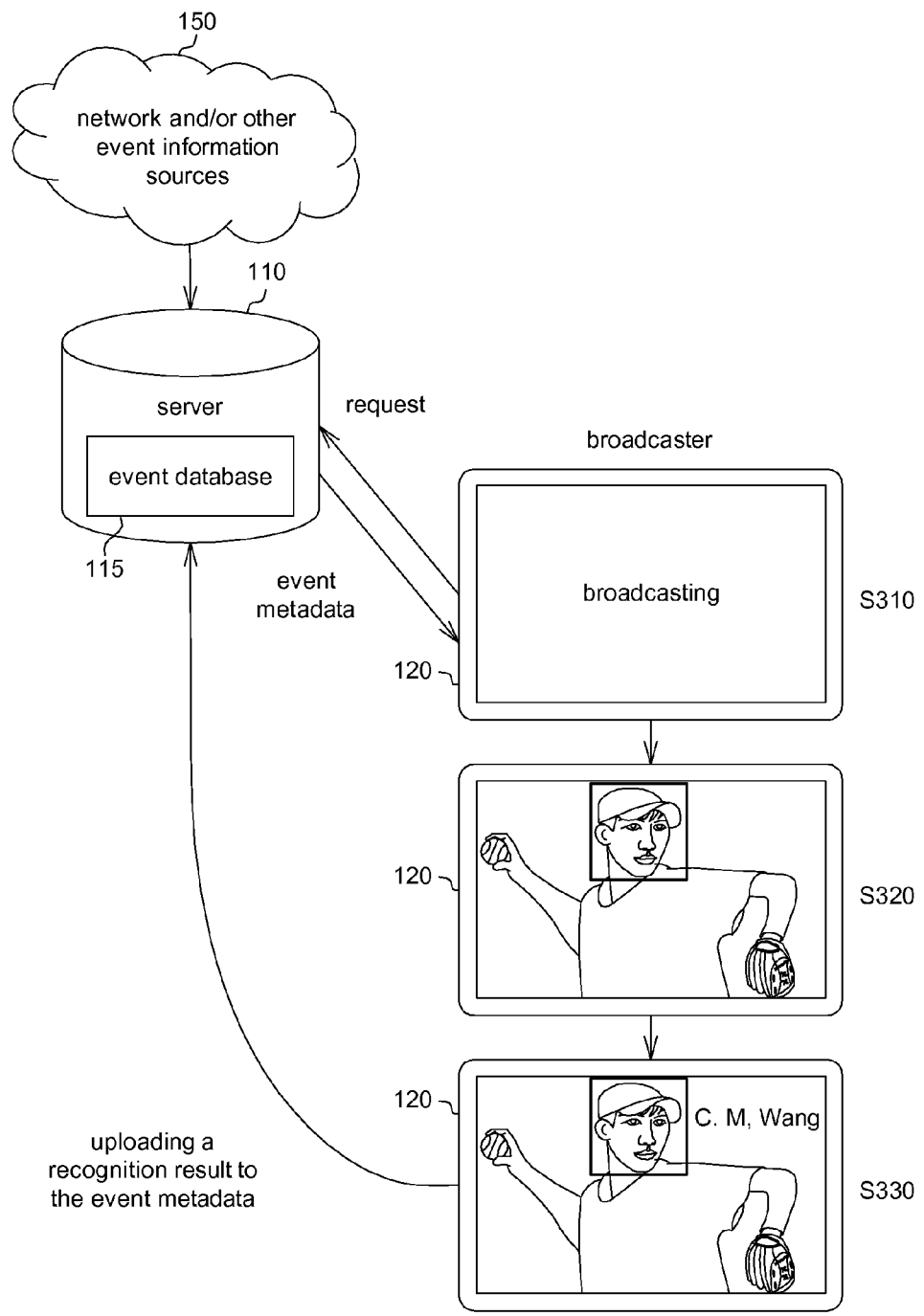
FIG. 3 shows a broadcaster obtaining event metadata from a server for performing object recognition according to an embodiment of the disclosure.

Referring to FIG. 3 which shows the broadcaster obtains event metadata from the server for object recognition according to the embodiment of the disclosure. As indicated in FIG. 3, before object recognition and image broadcasting, in step S310, the broadcaster 120 sends a request to the server 110 for requesting the server 110 to send an event metadata. Moreover, the broadcaster 120 will send its relevant event information, such as position information and time information, to the server 110. After receiving the request, the server 110 will obtain relevant event metadata from the event database 115 (or search relevant event metadata from the network and/or other event information sources 150) and send the relevant event metadata to the broadcaster 120.

After receiving the event metadata, in step S320, the broadcaster 120 performs image broadcasting. The broadcaster 120 analyzes the captured image to perform object recognition according to the metadata in a real-time manner.

If the broadcaster 120 recognizes object, in step S330, the broadcaster 120 sends the recognition result to the server 110. The server 110 regards the metadata generated by the broadcaster as a part of the event database for more users to use.

In the embodiment of the disclosure, when performing object recognition, the broadcaster 120 does not perform object recognition at will. The broadcaster 120 receives metadata from the server 110. After capturing the facial image of the player in the stadium, the broadcaster 120 determines whether the player is an object player according to the metadata. For the broadcaster, since the recognition is performed according to the metadata, the recognition range is largely narrowed, and there is no need to perform wide-range recognition on the captured player image. Thus, the broadcaster will have much higher success rate in recognition and much less burden in hardware resource.

In convention, the broadcaster does not received the metadata and thus has to download a large volume of facial recognition database to its internal storage unit in advance before performing facial recognition. Consequently, the convention broadcaster has larger burden in terms of hardware resource, and may spend much more time in recognition.

Figure 4:
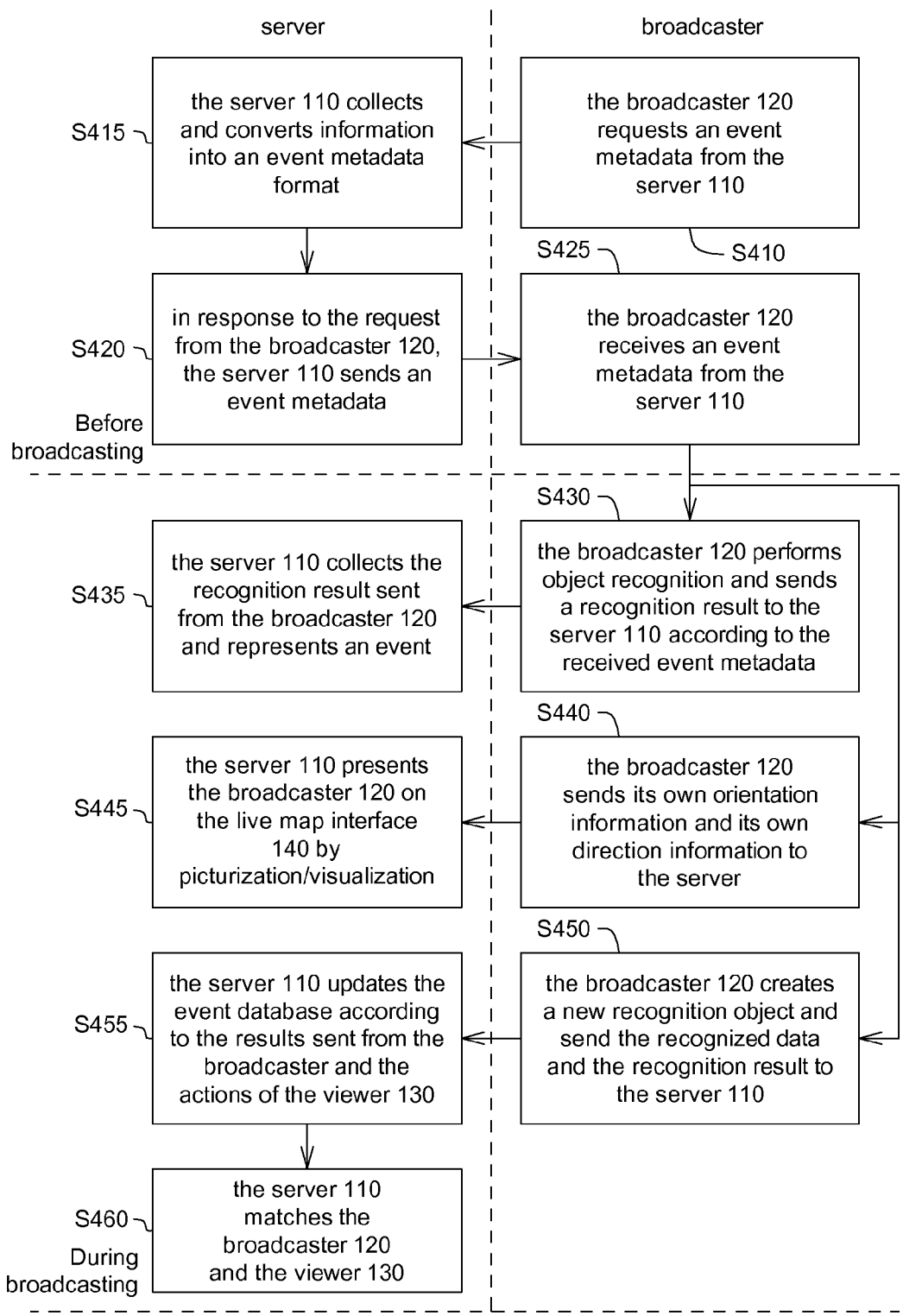
FIG. 4 shows a flowchart of the signal between the server and the broadcaster according to an embodiment of the disclosure.

FIG. 4 shows a flowchart of signal flow between the server and the broadcaster according to the embodiment of the disclosure. As indicated in FIG. 4, in step S410, the broadcaster 120, before image broadcasting, requests an event metadata from the server 110.

In step S415, the server 110 collects relevant information from the network and/or an event information source 150, and converts the collected information into an event metadata format.

In step S420, in response to the request from the broadcaster 120, the server 110 sends an event metadata. In step S425, the broadcaster 120 receives the event metadata from the server 110. Steps S410-S425 are performed before the server 110 and the broadcaster 120 perform image broadcasting.

In step S430, the broadcaster 120 performs object recognition and sends a recognition result to the server 110 according to the received event metadata. In step S435, the server 110 collects the (at least one) recognition result sent from the broadcaster 120, and further represents the recognition result in real-time statistical data or real-time graphical/visual effect.

Figure 5A:
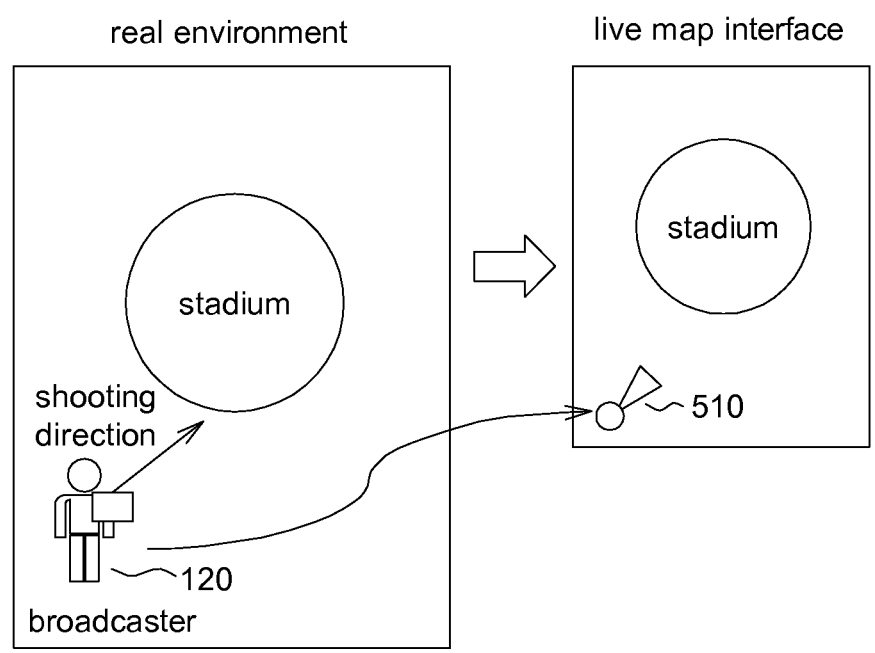
FIG. 5A shows an example of presenting a broadcaster through a live map interface by way of picturization/visualization according to an embodiment of the disclosure.

FIG. 5A shows an example of presenting the broadcaster 120 in the live map interface 140 by way of picturization/visualization according to the embodiment of the disclosure. Suppose the shooting position and the shooting direction of the broadcaster 120 are indicated as FIG. 5A. After receiving the shooting position information and the shooting direction information from the broadcaster 120, the server 110 combines the shooting position information and the shooting direction information with the real 3D architecture of the stadium. Thus, on the live map interface 140, the icon 510 may denote the broadcaster 120. That is, the viewer may understand the shooting position and the shooting direction of the broadcaster 120 via the live map interface 140. Thus, by way of picturization/visualization, the viewer 130 may quickly and intuitively locate the broadcasters 120 that are currently available for the viewer to select from. If the shooting position and/or the shooting direction of the broadcaster 120 change, the position and the direction of its corresponding icon 510 will change accordingly.

Figure 5B:
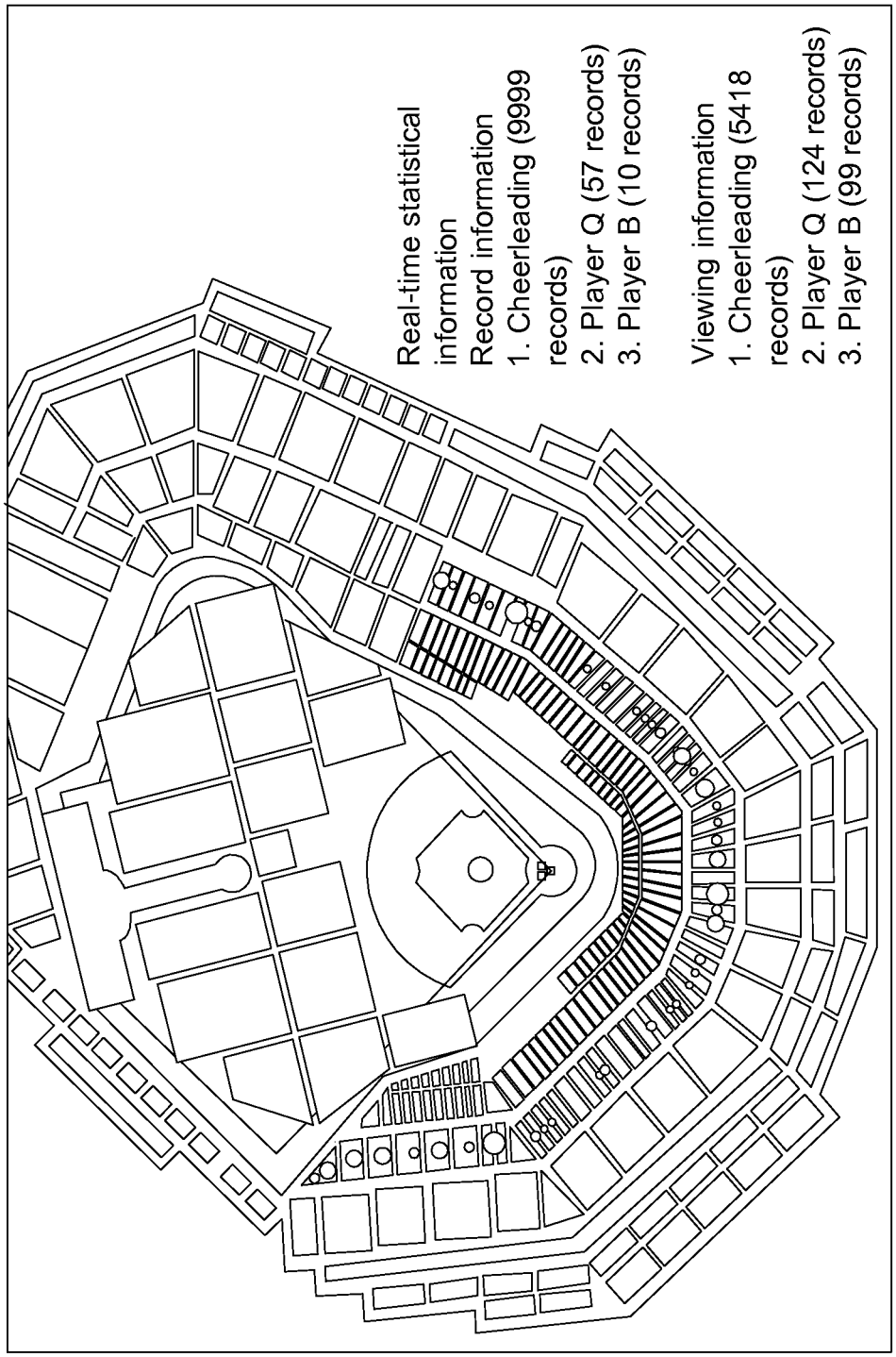
FIG. 5B shows an example of representing the recognition result sent from the broadcaster in real-time statistical data according to an embodiment of the disclosure.

FIG. 5B shows an example of representing the recognition result sent from the broadcaster 120 in real-time statistical data according to an embodiment of the disclosure. As indicated in FIG. 5B, the represented real-time statistical data includes information with largest number of records and information with largest number of requests. The information with largest number of records is such as "cheerleading (9999 records)" which means among the recognition results received by the server 110 from the broadcaster 120, 9999 records show that the broadcasters 120 recognize the cheerleading. The information with largest number of requests is such as "cheerleading (5418 requests)" which means among the requests received by the server 110 from the viewer 130, 5418 records show that the viewer 130 requests to view the cheerleading. In an embodiment of the disclosure, through the real-time statistical information, the broadcaster 120 and/or the viewer 130 may understand in a real-time manner who is the current focus in the stadium. Thus, the user in the stadium may be more fit in the atmosphere of the game.

In step S440, the broadcaster 120 sends its orientation information and its direction information to the server. The positioning sensor of the broadcaster identifies the current position of the broadcaster 120, and the orienting sensor identifies the current orientation of the broadcaster 120. After receiving the orientation information and the direction information of the broadcaster 120, the server 110 presents the broadcaster 120 on the live map interface 140 by way of picturization/visualization as indicated in step S445.

In step S450, if necessary, the broadcaster 120 may create a new recognition object (that is, the new recognition object not appearing in the event metadata sent from the server 110) and send the recognized data and the recognition result to the server 110. In step S455, the server 110 updates the event database according to the results sent from the broadcaster and the actions of the viewer 130. Thus, the event database is more capable of reflecting the behaviors of the broadcaster 120 and the viewer 130.

In step S460, the server 110 matches the broadcaster 120 and the viewer 130. That is, on the live map interface 140, if the viewer 130 is interested in the shooting position and the shooting direction of a broadcaster, then the viewer 130 may send a request to the server 110, which will then transmit the request to the broadcaster 120. If the broadcaster 120 consents the request, then the viewer 130 may view image and listen voice captured by the broadcaster 120 with his/her the device in a real-time manner.

Figure 6A:
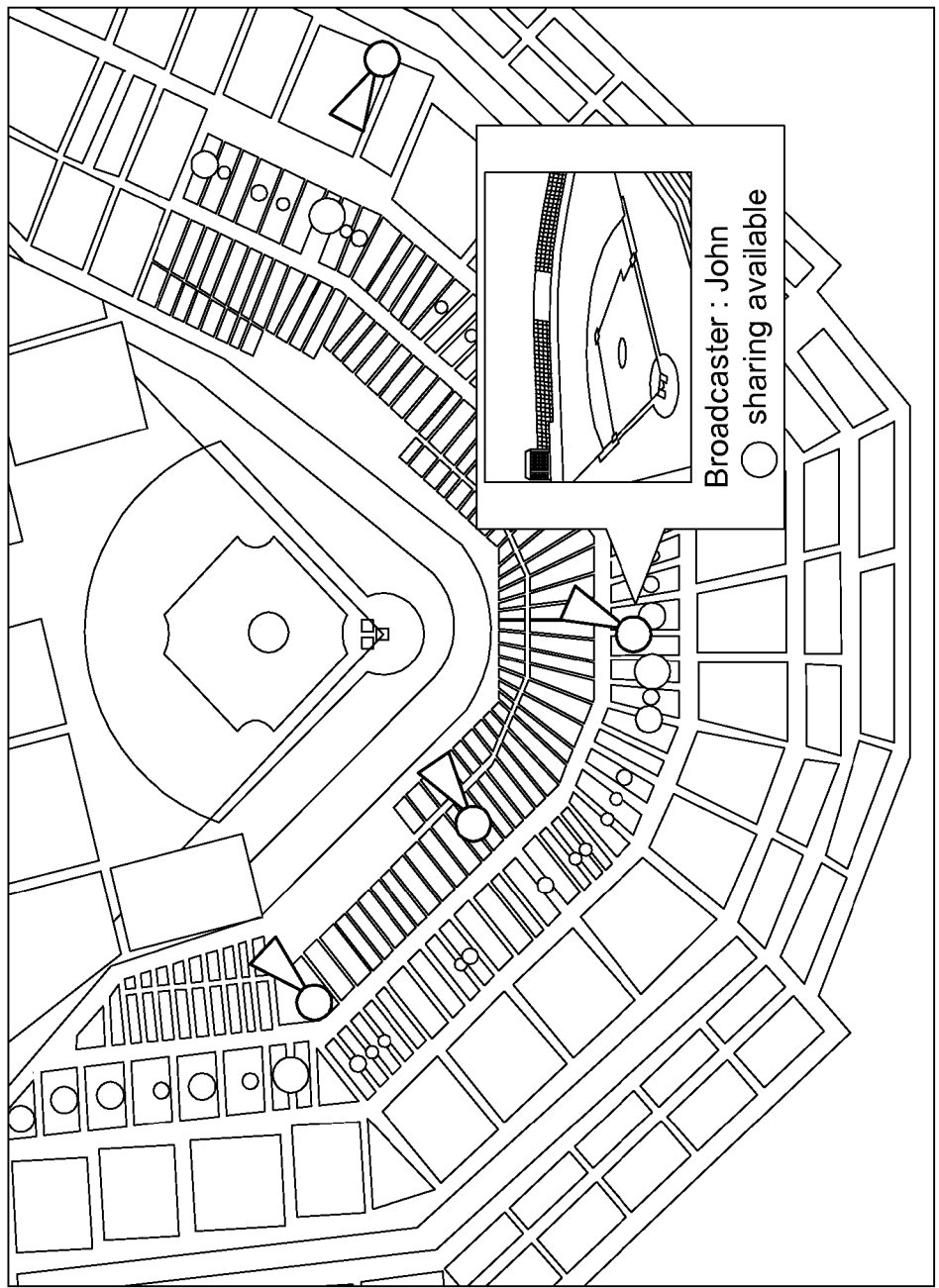
FIG. 6A-6C are an example of matching according to an embodiment of the disclosure.
Figure 6B:
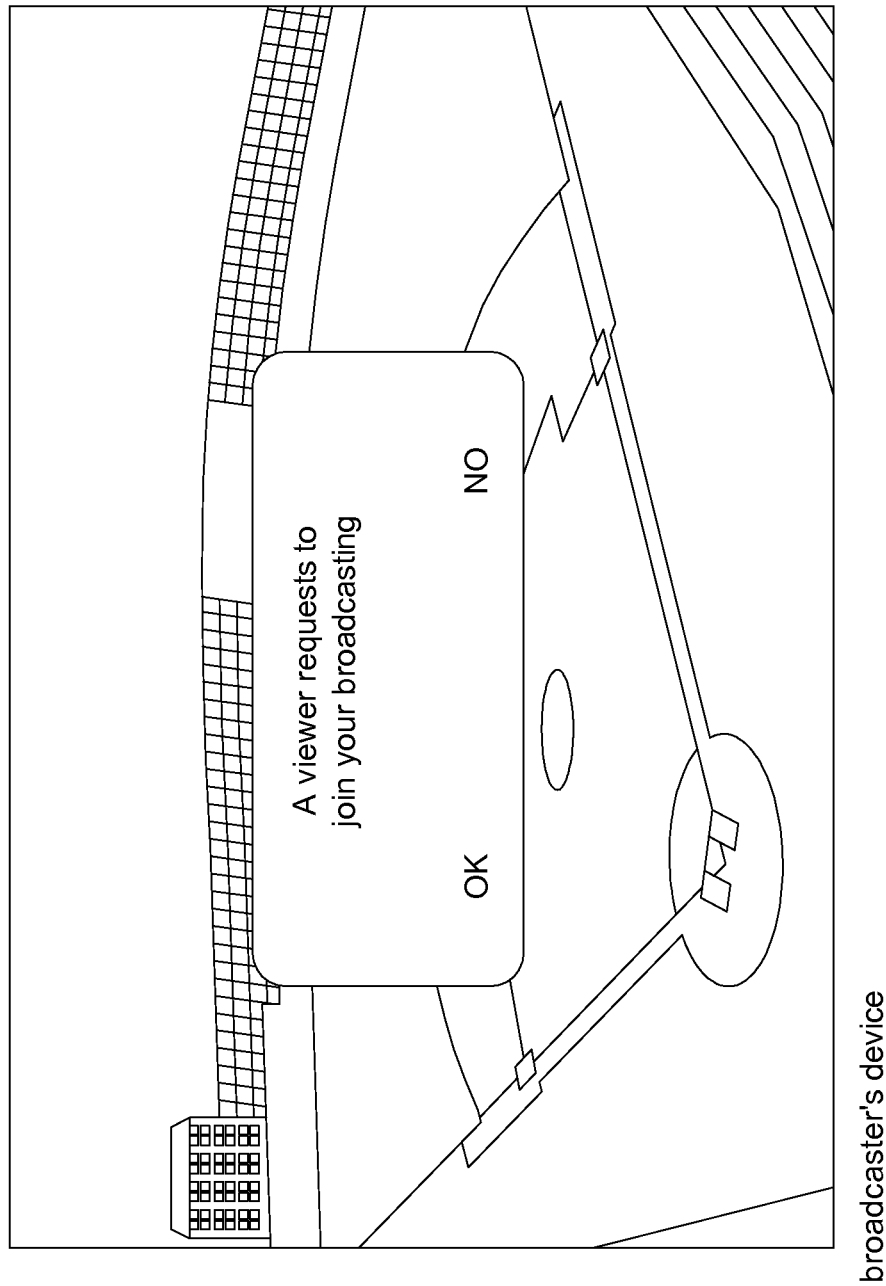
Figure 6C:
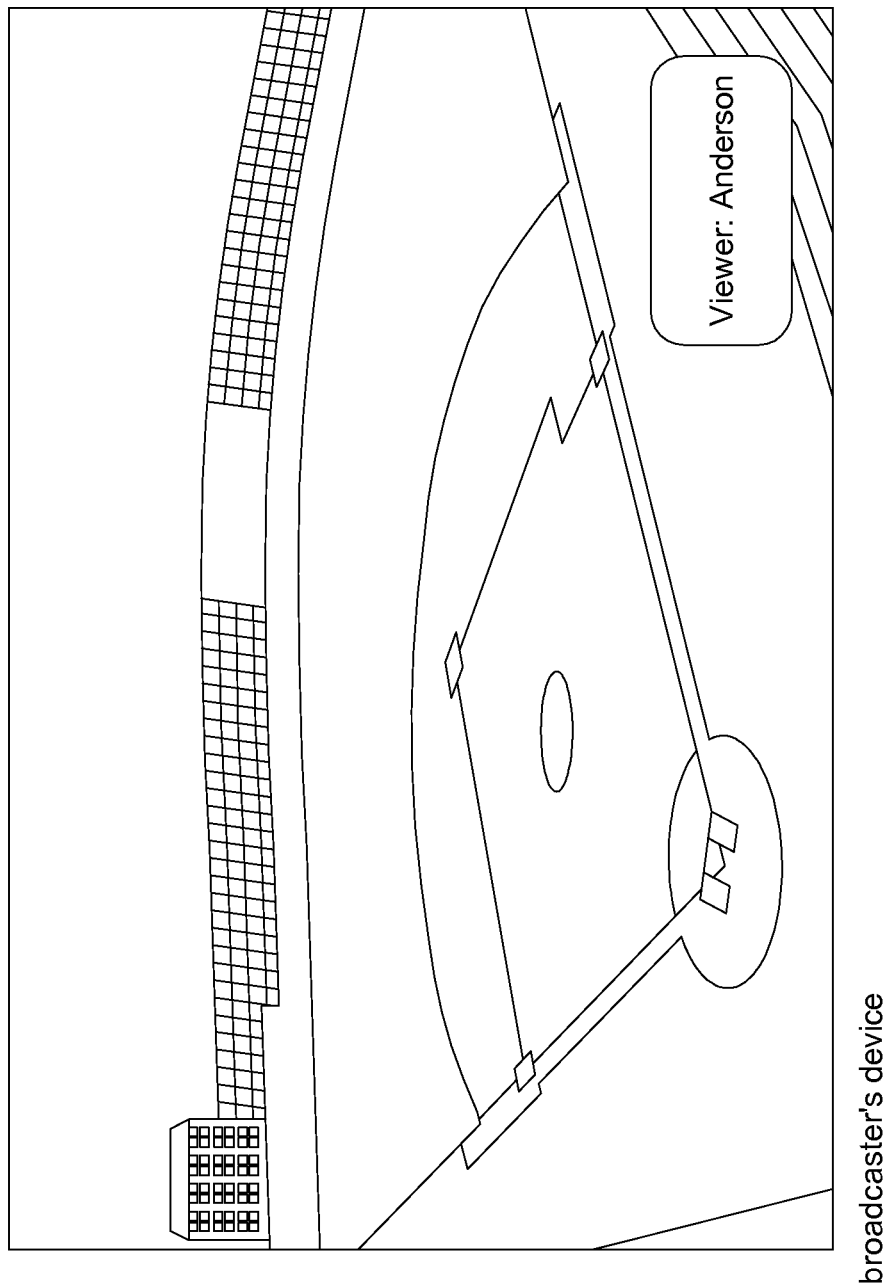

FIGS. 6A-6C are an example of matching according to an embodiment of the disclosure. As indicated in FIG. 6A, on the live map interface 140, if the viewer 130 is interested in the shooting position and the shooting direction of the broadcaster (John), then the viewer sends a broadcasting joining request to the server 110 to request for joining John's broadcasting. As indicated in FIG. 6B, the server 110 displays the "broadcasting joining request" on John's device and waits for John's consent. As indicated in FIG. 6C, if John consents the request, then the viewer may view John's live video broadcasting, and an icon "the viewer: Anderson" will be displayed on John's device.

Please be noted that in the embodiment of the disclosure, the sequence of steps S430-S460 are not restricted by the sequence in the above disclosure.

In another embodiment of the disclosure, the server 110 may further collect all event metadata (including the update data sent from the broadcaster) and all images sent from the broadcaster. Afterwards, if there are users wanting to view the game in a non-real-time manner, in addition to the game, the users may also view extra statistical information such as who ever asked to join the broadcasting, and add more fun to the users' viewing.

Figure 7:
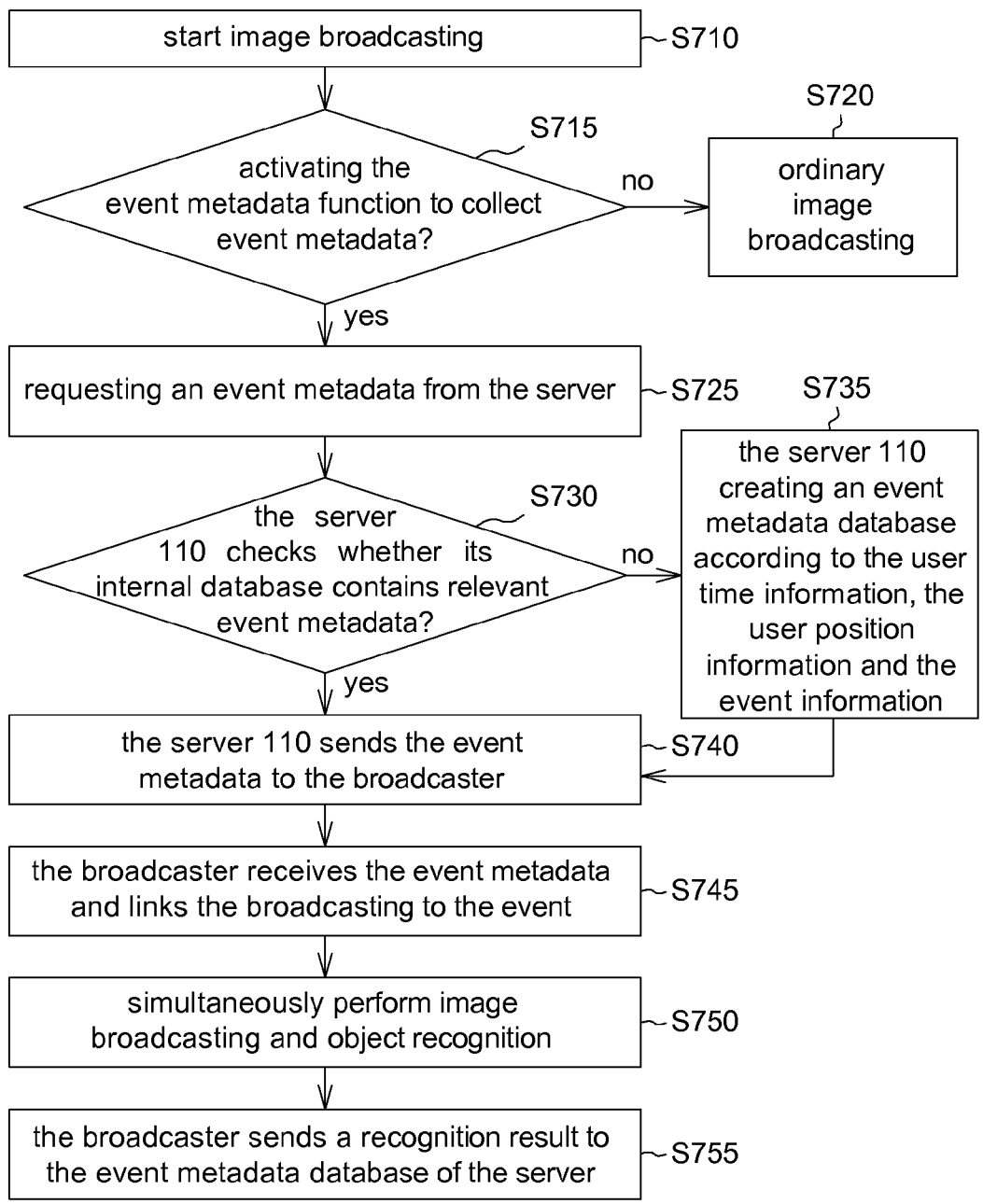
FIG. 7 shows a flowchart of broadcasting by a broadcaster according to an embodiment of the disclosure.

FIG. 7 shows a flowchart of broadcasting by a broadcaster according to the embodiment of the disclosure. As indicated in step S710, the broadcaster 120 starts image broadcasting. In step S715, the broadcaster determines whether to activate the event metadata function to collect the relevant information. If the broadcaster does not activate the event metadata function, then the broadcaster 120 performs ordinary image broadcasting as indicated in step S720.

If the broadcaster activates the event metadata function, then the broadcaster 120 requests an event metadata from the server 110 as indicated in step S725. In step S730, the server 110 checks whether its internal database contains relevant event metadata. If the internal database does not contain relevant event metadata, then the server 110 creates an event metadata database according to the user time information, the user position information and the event information as indicated in step S735.

If the internal database of the server 110 contains relevant event metadata, then the server 110 sends the event metadata to the broadcaster as indicated in step S740. As indicated in step S745, the broadcaster receives the event metadata and links the broadcasting to the event.

As indicated in step S750, the broadcaster simultaneously performs image broadcasting and object recognition. As indicated in step S755, the broadcaster sends a recognition result to the event metadata database of the server. Through the flowchart of FIG. 7, the broadcaster completes broadcasting and object recognition according to an embodiment of the disclosure.

Figure 8:
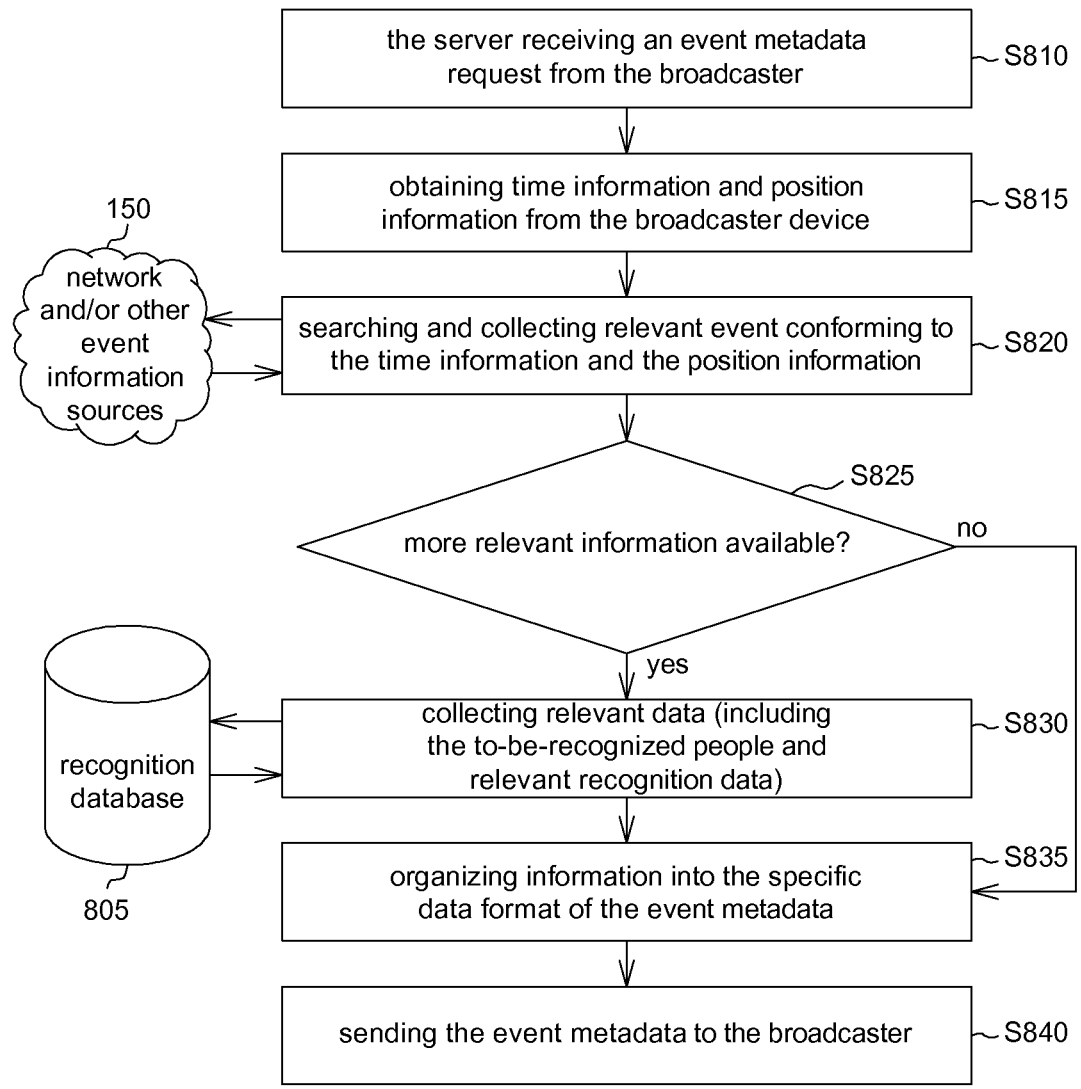
FIG. 8 shows a flowchart of creating new event metadata according to an embodiment of the disclosure.

Referring to FIG. 8, a flowchart of creating new event metadata according to an embodiment of the disclosure is shown. As indicated in step S810, the server receives an event metadata request from the broadcaster. As indicated in step S815, the server obtains the time information and the position information from the broadcaster device. Please be noted that the "time information" here refers to the event occurring time (such as the game time). As indicated in step S820, the server searches and collects relevant event conforming to the time information and the position information. For example, the server searches information from the network and/or other event information sources 150. As indicated in step S825, the server determines whether extra relevant information is available. If yes, then in step S830, the server collects all relevant data (includes the to-be-recognized people and relevant recognition data). In an embodiment of the disclosure, the server may collect the required relevant recognition data from the recognition database 805. If the server does not have "recognition database", the server may create a "recognition database", and details are disclosed below. The "recognition database" may include data such as photo, image, and voice of the to-be-recognized object. The recognition database 805 is coupled to the processing unit 111 of the server 110.

In step S835, the server organizes the above data into the event metadata matching the standard. In an embodiment of the disclosure, the event metadata is in a tag format as follows:
Event Type: Baseball game
Event Tag: <Baseball_11212011_Yankee_Wang>
People: (C. M. Wang) (including such as facial image, voice spectrum and recognition data)
Place: Yankee Stadium, New York (including such as geographic position, stadium orientation, longitude and latitude)
Time: 13:00-18:00, Nov. 21, 2011

In step S840, the server sends the event metadata to the broadcaster.

In addition, the broadcaster may send a recognition result to the server. In response to the recognition result sent from the broadcaster, the server provides an event metadata in the tag format as follows:

<Pitcher, Wang, 1344> (<Type, Name, Count>). The parameter "Type" denotes the player's type, the parameter "Name" denotes the player's name, and the parameter "Count" denotes the number of times that the player has been recognized.

The above tag example is merely used for describing an embodiment of the disclosure, not for limiting the disclosure.

Figure 9:
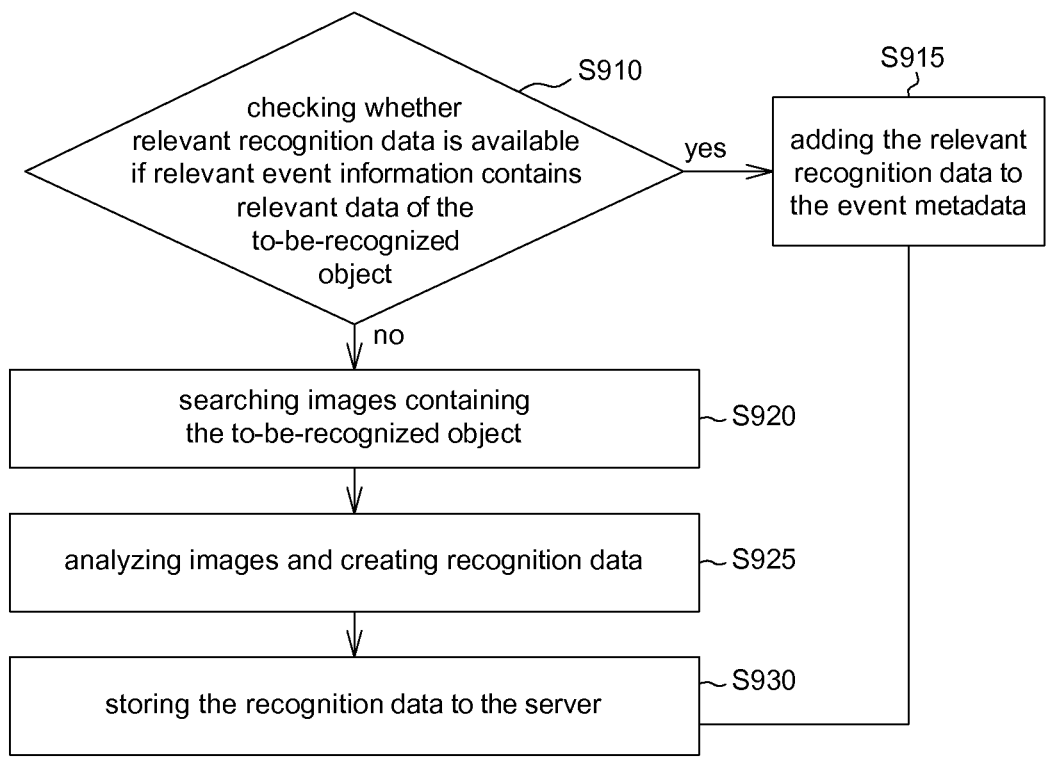
FIG. 9 shows a flowchart of creating recognition data by a server according to an embodiment of the disclosure.

Referring to FIG. 9, a flowchart of creating recognition data by a server according to an embodiment of the disclosure is shown. In step S910, the server checks whether the recognition data for the to-be-recognized object is available if relevant event information contains relevant data of the to-be-recognized object. If yes, in step S915, the server adds the relevant recognition data to the event metadata. If no, in step S920, the server searches those images containing the to-be-recognized object from the network and/or other event sources 150. In step S925, the server analyzes the images and creates a recognition data. The present step shows that in an embodiment of the disclosure, the broadcaster 120 does not need to analyze the images containing the to-be-recognized object because such analysis would consume considerable amount of computational resources.

In step S930, the server stores the recognition data to the recognition database of the server.

Figure 10:
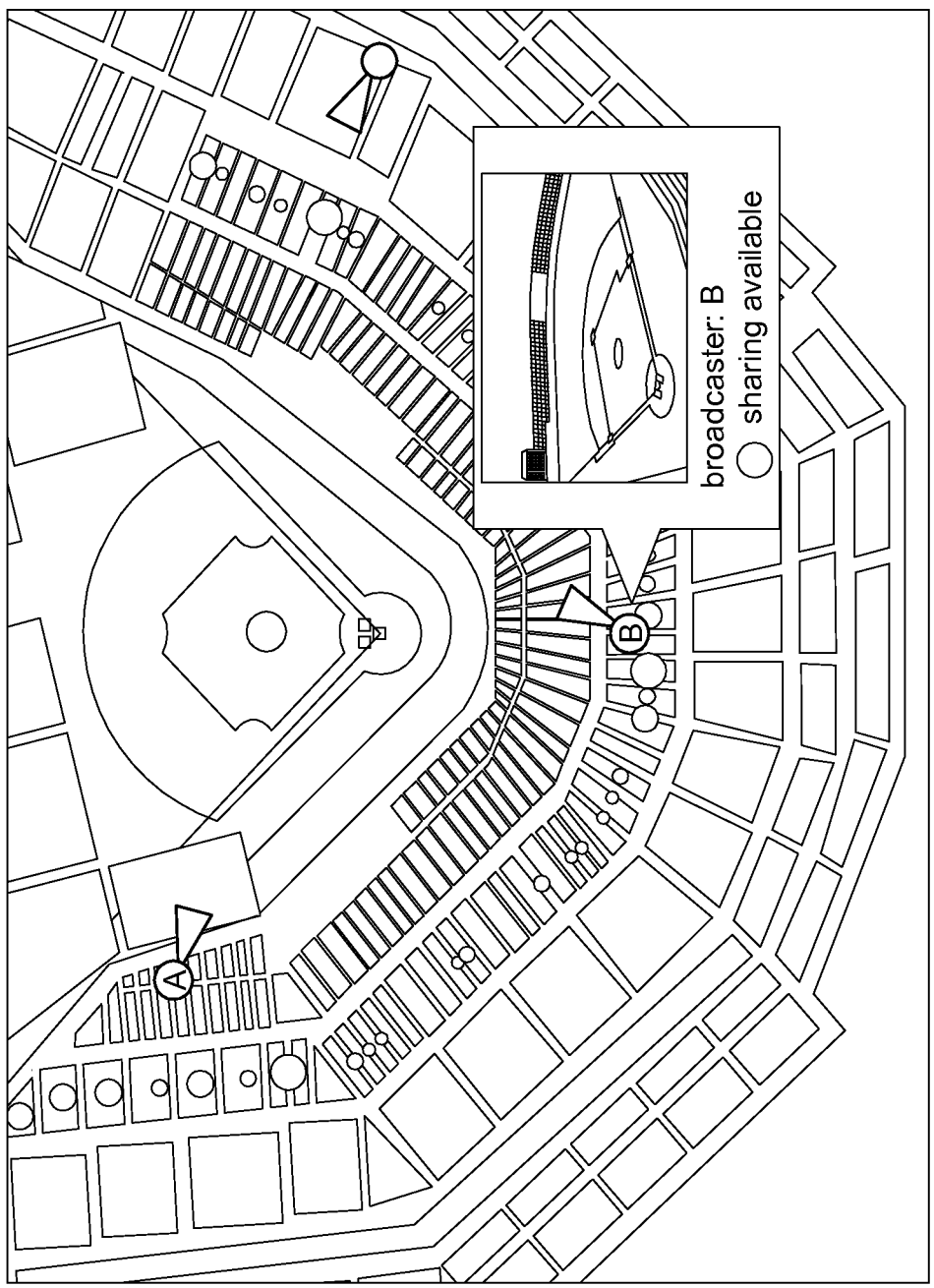
FIG. 10 shows a broadcaster A joining the broadcasting of another broadcaster B and becoming a viewer according to an embodiment of the disclosure.

In an embodiment of the disclosure, the broadcaster may also join another broadcaster's broadcasting and becomes a viewer. Referring to FIG. 10, a broadcaster A joins the broadcasting of another broadcaster B and becomes a viewer according to an embodiment of the disclosure. The broadcasters A and B are watching the same game. Due to the arrangement of the seat, the broadcaster A may not see the pitcher's actions clearly. Then, the broadcaster A may search other broadcastings from the live map interface to check whether any broadcaster's position and direction meet his interest. If the broadcaster A finds the broadcasting of broadcaster B may contain his desired view-angle and vision, the broadcaster A may click on the icon of broadcaster B displayed on the live map interface to request for joining the broadcasting of the broadcaster B. If the broadcaster B consents the request, then the broadcaster A may become a viewer of broadcaster B to watch the live video broadcasting of broadcaster B. That is, in an embodiment of the disclosure, the user may be a broadcaster and a viewer at the same time.

According to the above disclosure, when watching a live game, in addition to what a user sees with his/her eyes, the user may further watch other broadcasters' broadcastings with his/her electronic device such as a mobile phone, and add more fun to watching the game.

In an embodiment of the disclosure, the users may further talk to each other via a network (despite they do not know the other party's mobile number). When the talk ends, not any party can access the other party's number (unless the number is provided by the owner during the talk). Thus, the users may enjoy discussing the game and talking to others during the game without having to worry about privacy intrusion and telephone harassment after the game is over.

The embodiment of the disclosure may further be combined with a social network. For example, the user may login the live map interface with his/her social network account. The user may find people with common interest in the live map interface, and add them to his/her contacts in the social network.

In an embodiment of the disclosure, the collected event metadata is processed and used for advertisement and commercial promotion.

In an embodiment of the disclosure, when the user watches a broadcaster's live video broadcasting, the presentation of images is versatile. For example, the user may watch live video broadcasting by way of picture in picture (PIP), so as to grasp multivariate sources of information at the same time.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An object recognition and event representation system, comprising:
   a server, and
   a broadcaster coupled to the server,
   wherein,
   in response to a request sent from the broadcaster, the server sends an event metadata and a recognition data;
   according to the event metadata and the recognition data, the broadcaster simultaneously performs a live video broadcasting action and a real-time object recognition action; and
   if the broadcaster recognizes an object, the broadcaster sends a recognition result to the server.

2. The object recognition and event representation system according to claim 1, wherein,
   in response to the request, the server searches the event metadata from an internal event database and sends the event metadata to the broadcaster;
   the server further searches the event metadata from a network and/or other event information sources; and
   in response to the recognition result of the broadcaster, the server updates the internal event database.

3. The object recognition and event representation system according to claim 2, wherein,
   the server converts a collected information into an event metadata format.

4. The object recognition and event representation system according to claim 2, wherein,
   the server collects the recognition result sent from the broadcaster for event representation.

5. The object recognition and event representation system according to claim 4, wherein,
   the server represents an event in a real-time statistical data or a real-time broadcaster icon.

6. The object recognition and event representation system according to claim 5, wherein,
   the broadcaster sends a shooting position information and a shooting direction information of the broadcaster to the server;

the server combines the shooting position information and the shooting direction information of the broadcaster in a real environment architecture; and in a live map interface, the server uses the real-time broadcaster icon to denote the broadcaster.

7. The object recognition and event representation system according to claim 6, further comprising:

a viewer coupled to the server and the broadcaster, after the viewer secures consent from the broadcaster, the viewer views the broadcaster's live video broadcasting on the live map interface in a real-time manner through a matching made by the server.

8. The object recognition and event representation system according to claim 7, wherein, the server updates the event database according to an action of the viewer.

9. The object recognition and event representation system according to claim 7, wherein, if the live map interface is presented in a webpage, the viewer is connected to the server via a browser software to view the broadcaster's live video broadcasting in a real-time manner.

10. The object recognition and event representation system according to claim 7, wherein, if the live map interface is presented in an application, the live map interface proactively transmits the broadcaster's live video broadcasting to the viewer in a real-time manner.

11. The object recognition and event representation system according to claim 6, further comprising another broadcaster, wherein, after the other broadcaster secures consent from the broadcaster, the other broadcaster views the broadcaster's live video broadcasting through the live map interface in a real-time manner through a matching made by the server.

12. The object recognition and event representation system according to claim 5, wherein, the real-time statistical data comprises a recording information and/or a viewing information.

13. The object recognition and event representation system according to claim 1, wherein, according to the received event metadata, the broadcaster analyzes a captured image to perform the real-time object recognition.

14. The object recognition and event representation system according to claim 1, wherein, the broadcaster creates a new recognition object, which is not in the event metadata sent from the server; and the broadcaster recognizes the new recognition object and sends a new recognition object result to the server to update the event database accordingly.

* * * * *